L. N. LACOMBE.
FRICTION GEARING.
APPLICATION FILED OCT. 6, 1910.
1,011,629.
Patented Dec. 12, 1911.
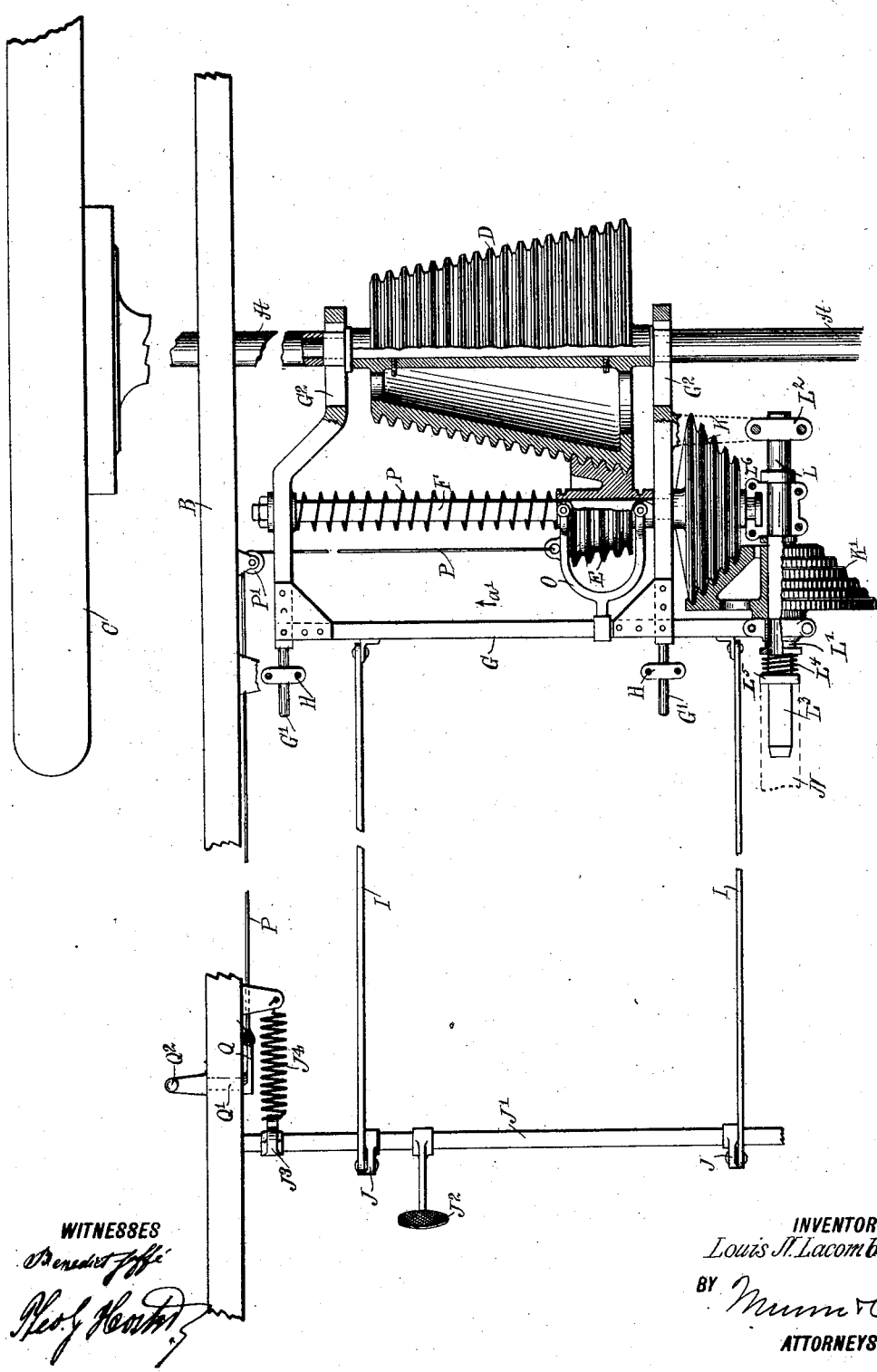
WITNESSES
INVENTOR
Louis N. Lacombe
BY
ATTORNEYS

UNITED STATES PATENT OFFICE.

LOUIS NAPOLEAN LACOMBE, OF NEW YORK, N. Y.

FRICTION-GEARING.

1,011,629.  Specification of Letters Patent.  Patented Dec. 12, 1911.

Application filed October 6, 1910. Serial No. 585,561.

*To all whom it may concern:*

Be it known that I, LOUIS N. LACOMBE, a citizen of the United States, and a resident of the city of New York, borough of Brooklyn, in the county of Kings and State of New York, have invented a new and Improved Friction-Gearing, of which the following is a full, clear, and exact description.

The object of the invention is to provide a new and improved friction gearing, more especially designed for use on automobiles and other motor vehicles, and arranged to permit a gradual change from a low speed to a high speed and vice versa, and to provide a wholly friction drive from the motor shaft to the vehicle axle to be driven. For the purpose mentioned, use is made of a variable friction device having a driven wheel attached to the axle of the vehicle, and a friction drive between the motor shaft and the shiftable driving pinion that engages the driven wheel.

A practical embodiment of the invention is represented in the accompanying drawing forming a part of this specification, in which the figure is a sectional plan view of the friction gearing as applied to a motor vehicle.

The rear axle A of the vehicle is journaled in the usual manner in the frame B and carries the rear wheels C, and on the said rear axle A is secured a conical friction wheel D having a series of concentric corrugations intermeshing with similar corrugations on a conical pinion E, mounted to turn with and to slide axially on a polygonal shaft F which is parallel to the axle A, and journaled in suitable bearings arranged on a frame G. The forward end of the latter is provided with pins G' mounted to slide in bearings H attached to the frame B, the rear end of the said frame G having elongated bearings $G^2$ slidably engaging the axle A. Links I pivotally connect the forward end of the frame G with an arm J on a shaft J' journaled on the frame B and carrying a pedal $J^2$ under the control of the chauffeur or driver of the motor vehicle, so that when the pedal $J^2$ is pressed the shaft J' is rocked and thus caused to impart a forward sliding motion to the frame G which moves the conical friction pinion E out of mesh with the conical driven wheel D. On the shaft J' is secured an arm $J^3$ pressed on by a spring $J^4$ attached to the frame B, so that when the chauffeur releases the pressure on the pedal $J^2$ then the shaft J' is rocked in a reverse direction and consequently the frame G is caused to slide rearward to move the conical friction pinion E again into mesh with the conical friction wheel D.

On countershaft F is keyed a corrugated or circumferentially grooved cone friction pulley K, and it meshes with a similarly grooved pulley K' mounted slidable on the squared portion of a shaft $L^3$ arranged across the end of shaft F and having a bearing in the same block as the latter and also in a portion of frame bar G. The pulley K' has a hub extension L' and between this and a collar $L^5$ on shaft L is interposed a spiral spring $L^4$, which presses pulley K' against pulley K. A collar $L^6$ is fast on the shaft L adjacent to bearing $L^2$ which is formed in the outer end of an arm of frame G. The square end $L^3$ of the shaft L slidingly engages a correspondingly-shaped socket in the shaft N of the motor so that when the latter is running a rotary motion is given to the shaft L, which by the intermeshing wheels K and K' rotates the shaft F, and the latter by the pinion E rotates the friction wheel D and the axle A to drive the vehicle forward or backward according to the direction in which the shaft N is running at the time.

The conical friction pinion E is engaged by a shifting fork O mounted to slide along a member $G^3$ of the frame G, and the said fork O is connected with one end of a rope, cable or a like flexible connection P, which passes around a guide pulley P' and connects with an arm Q on a shaft Q', journaled on the frame B and carrying a hand lever $Q^2$ that is under the control of the chauffeur, so that when the pedal $J^2$ is pressed and the pinion E is out of engagement with the wheel D and the chauffeur moves the lever $Q^2$ forward then the fork O is caused to slide on the bar $G^3$, and when the chauffeur releases the lever $Q^2$ then a spring R coiled on the shaft K and pressing the pinion E moves the latter in the reverse direction of the arrow $a'$.

From the foregoing it will be seen that when the chauffeur presses the pedal $J^2$ and the pinion E moves out of engagement with the wheel D then the chauffeur on actuating the lever $Q^2$ can shift the pinion E along the shaft P to shift the same into any position relative to the wheel D, after which the chauffeur releases the pressure on the pedal $J^2$ so that the frame G moves rearwardly and the pinion E intermeshes with the wheel D at the desired point.

It is understood that the shaft L at all times remains connected with the motor shaft N so that the intermeshing wheels K and K' constantly drive the shaft F by friction and the axle A is driven by friction from the intermeshing pinion E and the wheel D. It will further be noticed that the gearing from the motor shaft N to the rear axle A is wholly a friction drive and hence the vehicle can be started and stopped easily without shocks or jars.

As shown in the drawing, the pinion E is in mesh with the wheel D at the base end of the wheel D and the transmission of power is therefore at slow speed, and when the pinion E is shifted to the apex end of the wheel D the transmission of power is at high speed.

The friction gearing shown and described is very simple and durable in construction and can be readily applied to all makes of automobiles and other motor vehicles, and by the use of the friction gearing the vehicle may be braked on going down steep hills, as the operator on pressing the pedals $J^2$ very hard can force the frame G rearward with such force that the pinion E engages the wheel D correspondingly to increase the friction between the same for braking purposes.

Having thus described my invention, I claim as new and desire to secure by Letters Patent:

1. In a friction gearing of the class indicated, the combination with a vehicle axle and a corrugated conical friction wheel keyed thereon, of a frame arranged horizontally in front of said axle and its rear ends supported slidably thereon, means for also supporting the front ends of said frame slidably, and means under the control of the operator for shifting it forward, a spring for retracting it, a counter-shaft journaled in the frame parallel to the axle and having a shiftable conical corrugated pinion for engaging the aforesaid wheel, the frame having a front bar parallel to the counter-shaft, a device which is slidable thereon and engages the aforesaid pinion, means under the control of the operator for shifting the pinion toward the smaller end of the axle wheel, a spring which is applied to the counter-shaft and acts on the pinion, and means for driving such counter-shaft, as shown and described.

2. In a friction gearing of the class indicated, the combination with a vehicle axle and a corrugated conical friction wheel keyed thereon, of a frame arranged horizontally in front of said axle and its rear ends supported slidably thereon, means for also supporting the front ends of said frame slidably, and means under the control of the operator for shifting it forward, the same consisting of a front rock-shaft having a pedal attachment, links connecting the slidable frame with arms on the rock-shaft, a retracting spring attached to the frame and an arm of the rock-shaft for shifting the movable frame backward, and motor-driven means for rotating the counter-shaft, substantially as described.

In testimony whereof I have signed my name to this specification in the presence of subscribing witnesses.

LOUIS NAPOLEAN LACOMBE.

Witnesses:
WILLIAM JAS. CARROLL,
GEORGE W. THOMPSON,
JOHN J. DONAGHY.